(12) United States Patent
Schmidt et al.

(10) Patent No.: US 11,046,141 B2
(45) Date of Patent: Jun. 29, 2021

(54) SPRING PLATE

(71) Applicants: THYSSENKRUPP BILSTEIN GMBH, Ennepetal (DE); thyssenkrupp AG, Essen (DE)

(72) Inventors: Klaus Schmidt, Bergisch-Gladbach (DE); Andreas Mai, Sprockhövel (DE)

(73) Assignees: thyssenkrupp Bilstein GmbH, Ennepetal (DE); thyssenkrupp AG, Essen (DE)

( * ) Notice: Subject to any disclaimer, the term of this patent is extended or adjusted under 35 U.S.C. 154(b) by 0 days.

(21) Appl. No.: 16/641,440

(22) PCT Filed: Aug. 7, 2018

(86) PCT No.: PCT/EP2018/071346
§ 371 (c)(1),
(2) Date: Feb. 24, 2020

(87) PCT Pub. No.: WO2019/042717
PCT Pub. Date: Mar. 7, 2019

(65) Prior Publication Data
US 2020/0180378 A1 Jun. 11, 2020

(30) Foreign Application Priority Data
Aug. 30, 2017 (DE) ...................... 10 2017 215 131.5

(51) Int. Cl.
*B60G 11/16* (2006.01)
*F16F 1/12* (2006.01)

(52) U.S. Cl.
CPC ........ *B60G 11/16* (2013.01); *B60G 2204/124* (2013.01); *B60G 2206/81012* (2013.01); *F16F 1/126* (2013.01)

(58) Field of Classification Search
CPC .... B60G 2204/124; B60G 2204/12422; B60G 2206/81012; B60G 11/16; B60G 15/063; F16F 1/126; F16F 2230/0023
See application file for complete search history.

(56) References Cited

U.S. PATENT DOCUMENTS

| 6,257,605 B1 | 7/2001 | Zernickel |
| 2009/0166940 A1* | 7/2009 | Lutz ..................... B60G 15/063 267/170 |
| 2014/0159295 A1* | 6/2014 | Nakamura .............. F16F 1/125 267/170 |

FOREIGN PATENT DOCUMENTS

| CN | 103890439 A | 6/2014 |
| CN | 104235246 A | 12/2014 |

(Continued)

OTHER PUBLICATIONS

English Translation of International Search Report issued in PCT/EP2018/071346, dated Nov. 7, 2018.

*Primary Examiner* — Paul N Dickson
*Assistant Examiner* — Scott F. Underwood
(74) *Attorney, Agent, or Firm* — thyssenkrupp North America, LLC

(57) ABSTRACT

A spring plate for supporting a vehicle suspension spring, with a surface facing toward the vehicle suspension spring and with at least one support point, wherein the spring plate has a region which extends from the surface in the direction of the vehicle suspension spring and forms the support point, and wherein a sheet-metal element acting as a corrosion protection element is fastened to the extended region and is in contact with the vehicle suspension spring in all operating states.

20 Claims, 1 Drawing Sheet

(56) References Cited

FOREIGN PATENT DOCUMENTS

| DE | 102005002231 A | 7/2006 | |
|---|---|---|---|
| DE | 102005021765 A | 11/2006 | |
| DE | 102005021765 A1 * | 11/2006 | .............. F16F 1/126 |
| DE | 102008046939 A | 5/2009 | |
| DE | 102008046939 A1 * | 5/2009 | ............. B60G 11/14 |
| DE | 10 2009 052 030 A | 5/2011 | |
| DE | 102013009637 A | 12/2014 | |
| EP | 0135808 A | 4/1985 | |
| EP | 1128085 B | 8/2001 | |

* cited by examiner

SPRING PLATE

CROSS REFERENCE TO RELATED APPLICATIONS

This application is a U.S. National Stage Entry of International Patent Application Serial Number PCT/EP2018/071346, filed Aug. 7, 2018, which claims priority to German Patent Application No. DE 10 2017 215 131.5, filed Aug. 30, 2017, the entire contents of both of which are incorporated herein by reference.

FIELD

The present disclosure generally relates to a spring plate for supporting a vehicle suspension spring.

BACKGROUND

In the case of spring-bearing vibration dampers and McPherson suspension struts, the body spring (vehicle suspension spring) is usually supported on a spring plate fastened to the damper tube. The vehicle suspension springs are coated in order to protect them against corrosion. During driving, relative movements occur between the spring and the spring plate upon spring deflection and rebound and lead to damage to the coating layer of the spring. Springs with a damaged coating layer are susceptible to corrosion. Vehicle suspension springs are exposed to dirt and moisture in the region of the wheel suspension, which promotes undesired corrosion.

In order to reduce the risk of corrosion, DE 10 2005 021 765 A1 proposes a bearing arrangement for a vehicle spring which comprises a spring plate having a number of contact surfaces for guiding the vehicle suspension spring, wherein, at least above a defined loading of the spring, a cathodic corrosion protection element comes into operative connection with the spring. The corrosion protection element is fastened exchangeably in a receptacle of the bearing arrangement. An advantage pointed out in DE 10 2005 021 765 A1 is that the cathodic corrosion protection can be maintained over the service life of the vehicle, because the corrosion protection element can be exchanged when it is expended.

DE 10 2005 021 765 A1 describes various ways in which the corrosion protection element can be arranged. According to a first embodiment, it can be formed as a bolt-like body which is in contact with an end face of the spring which faces toward said body (FIGS. 1 and 2). According to a second embodiment, the corrosion protection element can be arranged in a receptacle of a spring pad (FIGS. 3-6). According to a third embodiment, the corrosion protection element is formed as a shell element which at least partly covers the surface of the vehicle suspension spring (FIG. 8). In the first abovementioned embodiment, it is not possible to reliably avoid damage to the coating layer of the spring in the spring/spring plate contact region; in the second abovementioned embodiment, an additional component in the form of a spring pad is absolutely necessary; and in the third abovementioned embodiment, a relatively large shell-like corrosion protection element is required that has to be attached to the end turn of the spring, which is complicated.

EP 1 128 085 B1 also describes a solution in which a separate spring pad with a base element made from an elastomer material is absolutely necessary. Moreover, an intermediate plate made from metal and formed as a sacrificial anode is additionally provided and comes into contact with a turn portion of the spring, at least upon relatively strong spring deflection. The spring pad and the intermediate plate provided with passage openings for protrusions of the base element have to be provided together and interact since the spring is supported on those protrusions of the base element that pass through the intermediate plate in the region of the passage openings. The complexity of this structure is considerable.

Thus a need exists for a spring plate for supporting a vehicle suspension spring and with a corrosion protection device for the spring, which spring plate is configured in a structurally simple manner and in which a spring pad for supporting the spring is not necessary.

DETAILED DESCRIPTION

Figure 1:
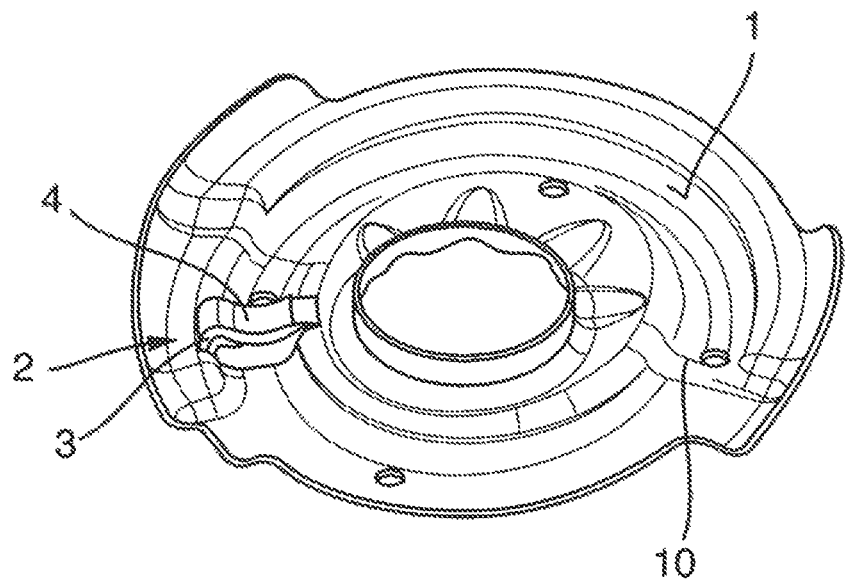
FIG. 1 is a perspective view of a spring plate.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The invention relates to a spring plate for supporting a vehicle suspension spring, as is used for example in suspension struts for motor vehicles.

According to the invention, the spring plate for supporting a vehicle suspension spring has a surface facing toward the vehicle suspension spring and at least one support point, wherein the spring plate has a region which extends from the surface in the direction of the vehicle suspension spring and forms the support point, and wherein a sheet-metal element acting as a corrosion protection element is fastened to the extended region and is in contact with the vehicle suspension spring in all operating states. The extended region provides a structurally clearly defined support point on the spring plate, on which support point the spring is permanently supported in all operating states, i.e. in particular in all spring deflection states. In all operating states, the spring is in contact with the spring plate at this support point, and only those turns of the spring that lie behind the support point as seen from the support plate form the resilient region of the spring. Forming the spring plate in this way means that particles of dirt cannot penetrate between the spring and the spring plate and damage the coating layer.

According to the invention, at the same time the defined support point is used to fasten a corrosion protection element thereto which is formed as a sheet-metal element and is in contact with the vehicle suspension spring in all operating states. It is thus possible to implement, in a simple manner, the situation in which the corrosion protection element is in constant contact with the spring and can perform its corrosion protection function.

The sheet-metal element serving as a corrosion protection element may consist of zinc or of a zinc alloy. The sheet-metal element can be connected to the extended region in a particularly simple manner if it has limbs which are bent around the extended region to fasten the sheet-metal element. In this way, a corrosion protection element fastened to the extended region can be exchanged for a new corrosion protection element if required, e.g. in the case of corresponding wear.

Rivets, Torx screws or screws can also be considered as alternative fastening options, wherein the exchangeability of the sheet-metal element is retained, at least when a screw connection is used.

Experience has shown that, in the region of the clearly defined support point, damage to the coating layer of the spring cannot be ruled out in practice. The invention advantageously provides, in this region of the support point, a corrosion protection element which consists of zinc sheet or of a zinc alloy, acts as a sacrificial anode and prevents the spring being subjected to a corrosion attack.

With respect to the material from which the spring plate is formed, a number of options are conceivable. Firstly, the spring plate may consist of plastic. It is then expedient to produce the spring plate by injection molding and to form the extended region in one piece with the spring plate. The spring plate including the extended region is then produced in one process step by injection molding. According to another embodiment, the spring plate may also consist of metal and be produced by a primary forming process (e.g. casting). In this embodiment, the extended region is likewise advantageously formed in one piece with the spring plate and is produced together with the spring plate by casting. According to a further embodiment, the spring plate consisting of metal may also be produced by shaping a sheet-metal blank in a shaping operation. In this situation, the extended region may be produced by shaping the spring plate blank or by shaping the otherwise already deformed spring plate in the region of the extended region. In this variant as well, the extended region is formed in one piece with the spring plate.

FIG. 1 illustrates a spring plate according to the invention, in which the surface 1 facing toward the vehicle suspension spring (not illustrated) is illustrated in a perspective view. The surface 1 has an end stop 10 on which an end face of the vehicle suspension spring, which is formed as a helical compression spring, is supported during operation. Furthermore, a region 3 which extends from the spring plate material is present and forms a defined support point for the vehicle suspension spring (not illustrated). In the exemplary embodiment illustrated, the spring plate has been produced from a sheet-metal-like semifinished product by shaping and the extended region has also been created by shaping.

The extended region 3 is in the form of a bridge and bears a sheet-metal element 4 acting as a corrosion protection element. This sheet-metal element 4 is thus arranged on the support point 2 and is in contact with the spring in all operating states, i.e. in particular in all spring deflection states of the vehicle suspension spring. In this way, the corrosion protection element acts on the vehicle suspension spring in a permanent and uninterrupted manner.

In the solution according to the invention, a separate spring pad can be entirely dispensed with. It is also advantageous that the corrosion protection element can be simply, and furthermore also detachably and thus exchangeably, connected to the spring plate.

Figure 2:
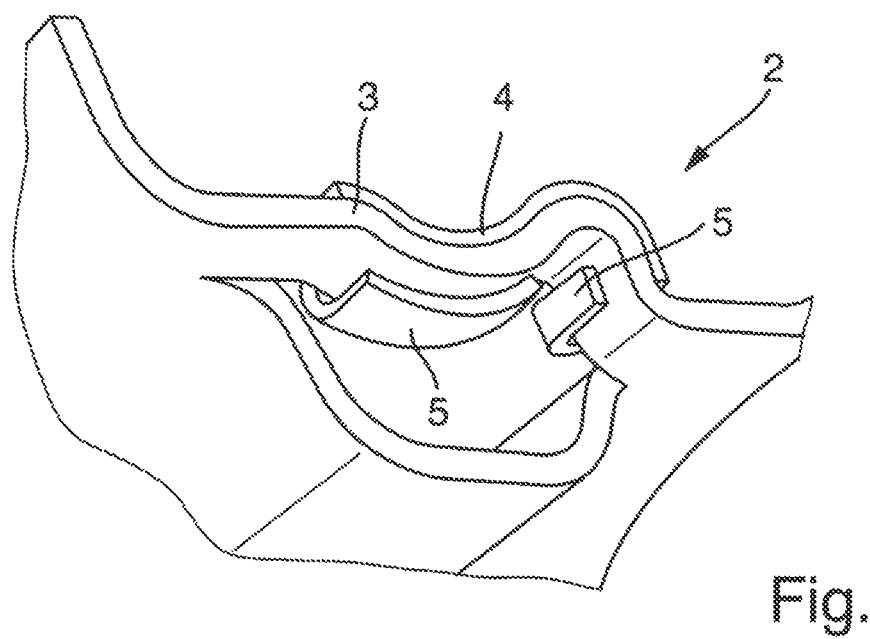
FIG. 2 is an enlarged detailed view of the support point formed by the extended region of the spring plate with a corrosion protection element.

FIG. 2 illustrates an enlarged detail of the spring plate according to the invention. The detail illustrated shows the extended region 3 of the spring plate on an enlarged scale. It can clearly be seen that the sheet-metal element 4 acting as a corrosion protection element has limbs 5 which are bent around the extended region 3 of the spring plate to fasten the sheet-metal element 4. This type of fastening makes it possible for the sheet-metal element 4, if required, to be pulled off again from the extended region 3 of the spring plate and replaced by a new sheet-metal element 4. Interchanging the corrosion protection element thus makes it possible to ensure permanent corrosion protection of the spring over the entire service life of the vehicle.

LIST OF REFERENCE SIGNS

1 Surface
2 Support point
3 Extended region
4 Sheet-metal element
5 Limb
10 Stop face

What is claimed is:

1. A spring plate configured to support a vehicle suspension spring, the spring plate comprising:
   a surface facing toward the vehicle suspension spring and with at least one support point;
   a region that extends from the surface in the direction of the vehicle suspension spring and forms the support point; and
   a sheet-metal element configured to act as a corrosion protection element, the sheet-metal element fastened to the region and configured to contact the vehicle suspension spring in all operating states.

2. The spring plate of claim 1, wherein the sheet-metal element consists essentially of zinc or of a zinc alloy.

3. The spring plate of claim 1, wherein the sheet-metal element includes limbs that are bent around the region to fasten the sheet-metal element.

4. The spring plate of claim 1, wherein the spring plate consists essentially of plastic.

5. The spring plate of claim 4, wherein the region is formed as a one-piece construction with the spring plate and the spring plate is produced by injection molding.

6. The spring plate of claim 1, wherein the spring plate consists essentially of metal.

7. The spring plate of claim 6, wherein the region is formed as a one-piece construction with the spring plate and the spring plate is produced by casting.

8. The spring plate of claim 6, wherein the region is formed as a one-piece construction with the spring plate and is produced by shaping the spring plate.

9. A spring plate configured to support a vehicle suspension spring that is coiled around a longitudinal spring axis, with the vehicle suspension spring having a length that extends along the longitudinal spring axis, the spring plate comprising:
   a surface configured to face the vehicle suspension spring and with at least one support point, wherein the longitudinal spring axis is normal to the surface;
   a region that extends from the surface towards the vehicle suspension spring and forms the support point, with the region being configured to receive the vehicle suspension spring in a manner whereby the vehicle suspension spring is transverse to and extends across the region; and a sheet-metal element configured to act as a corrosion protection element, the sheet-metal element fastened to the region and configured to contact the vehicle suspension spring in all operating states.

10. The spring plate of claim 9 wherein the region is radially spaced apart from an outer sidewall of the spring plate.

11. The spring plate of claim 9 wherein the region is curved to receive an outer surface of the vehicle suspension spring.

12. The spring plate of claim 9 comprising an end stop disposed on and protruding from the surface, wherein the end stop is in direct contact with an axial end of the vehicle suspension spring, with the end stop being annularly spaced apart from the region on the surface.

13. The spring plate of claim 9 wherein the sheet-metal element includes limbs that are bent around the region and fasten the sheet-metal element to the region, wherein the region is integral with the spring plate such that the region and the spring plate are a one-piece construction.

14. A spring plate configured to support a vehicle suspension spring, the spring plate comprising:
   a surface configured to face the vehicle suspension spring, wherein the surface includes a channel that extends in a circular or semi-circular direction;
   a region that forms a support point for the vehicle suspension spring, wherein the region is comprised of a strip of material that extends across the channel, transverse to the circular or semi-circular direction of the channel, with the strip of material being elevated relative to a bottom of the channel; and
   a sheet-metal element configured to act as a corrosion protection element, the sheet-metal element fastened to the region and configured to contact the vehicle suspension spring in all operating states.

15. The spring plate of claim 14 wherein the region is radially spaced apart from an outer sidewall of the spring plate.

16. The spring plate of claim 14 wherein the region is curved to receive an outer surface of the vehicle suspension spring.

17. The spring plate of claim 14 comprising an end stop disposed on and protruding from the surface, wherein the end stop is in direct contact with an axial end of the vehicle suspension spring, with the end stop being annularly spaced apart from the region on the surface.

18. The spring plate of claim 14 wherein the sheet-metal element includes limbs that are bent around the region and fasten the sheet-metal element to the region, wherein the region is integral with the spring plate such that the region and the spring plate are a one-piece construction.

19. The spring plate of claim 14 wherein the surface comprises an aperture at a bottom of the channel beneath the region.

20. The spring plate of claim 14 wherein the channel extends on both sides of the region.

* * * * *